June 28, 1960     A. BERNARDINI     2,942,515
PHOTOELECTRIC COLORIMETER
Filed July 20, 1956
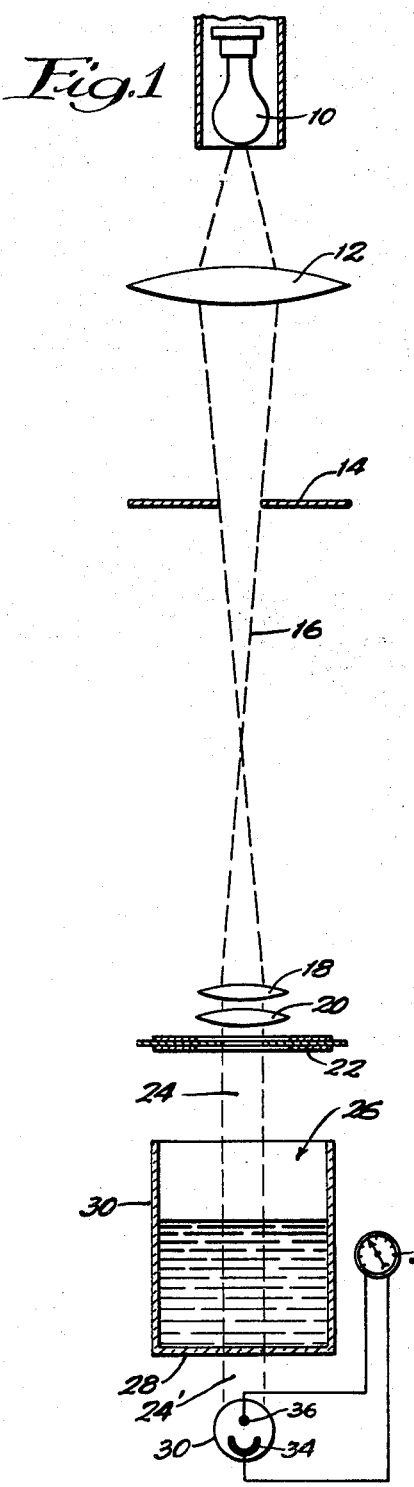
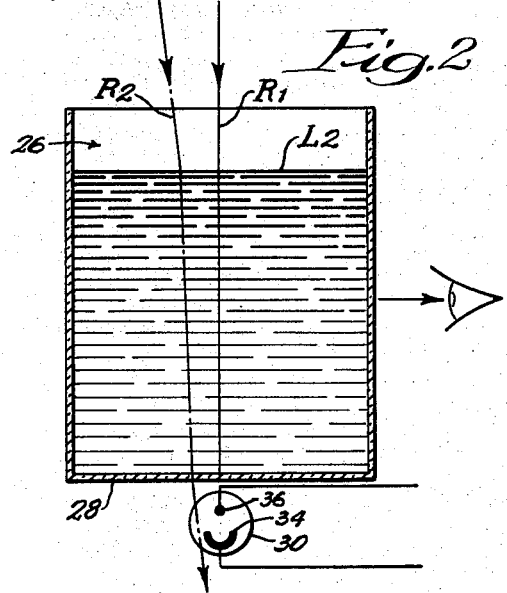
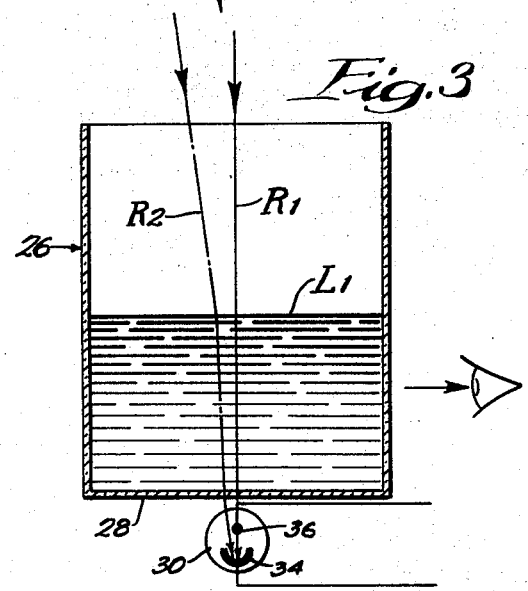
INVENTOR:
Angelo Bernardini,

United States Patent Office 2,942,515
Patented June 28, 1960

2,942,515

PHOTOELECTRIC COLORIMETER

Angelo Bernardini, 2940 E. 90th St., Chicago, Ill.

Filed July 20, 1956, Ser. No. 599,095

1 Claim. (Cl. 88—14)

This invention relates generally to a quantitative analytic apparatus, and more particularly to a photoelectric colorimeter.

It is the primary object of this invention to provide a colorimeter instrument operative in accordance with a novel principle to permit highly accurate and simple colorimetric analyses to be performed independently of the concentration of the sample being tested.

The colorimeter instruments which have formerly been known and used apply the same basic principle of colorimeter analysis, namely the assumption that the reduction of transmitted light through a solution is directly proportional to the amount of colored substance therein. This principle is well known as the Law of Lambert-Beer, and is expressed as follows:

$$(1) \qquad \log_{10} \frac{I_0}{I} = kcl.$$

The expression $$\frac{I_0}{I}$$

is the ratio of incident to transmitted light; $l$ is the thickness of the layer of solution; $c$ is the concentration of the color-lending substance in the solution in grams per liter; and $k$ is a constant for the particular color-lending substance, referred to as "specific extinction."

The relation between concentration and the volume of solution through which light passes and is obstructed by the color-lending substance is frequently expressed by the following equation:

$$(2) \qquad \frac{c_2}{c_1} = \frac{l_1}{l_2}$$

The Formulas 1 and 2 provide the theoretical basis for most colorimeter instruments. Some devices obtain the value of concentration of the test sample from the relation between the light transmission and the thickness of the solution or sample layer, the instrument being constructed to measure the magnitude of light transmission through the sample layer by photoelectric means and the layer thickness being determined by immersion of an optical plunger to micrometric displacement. Still other devices determine concentration by measuring the light transmission through a constant or known thickness of solution, usually determined by the distance between two opposite walls of a transparent test cell, such walls being generally arranged parallel to each other and perpendicular to the direction of a light beam. Still other devices require the dilution in a calibrated cell of a test solution until it matches the color intensity of a standard solution of known concentration of the same substance.

All of these instruments give good results within the limitations of their design and the practical manipulation of their variables by an operator. The purpose of former colorimeters, however, is primarily the determination of "concentration" of a certain substance which lends a color in a particular solution. Each determination, therefore, requires the precise measurement of the volume of the test solution prior to analysis in the colorimeter. In actual laboratory practice, this requirement for constant test volume, or for accurate measurement of solution thickness, introduces both a source of error and a time-consuming manual operation. It is a basic purpose of this invention to apply a new technique of measurement which is independent of solution concentration, thereby eliminating all requirements of volume determination.

With these and other objects in view, my invention consists in the construction, arrangement and combination of the various parts of my device whereby the objects contemplated are attained, as hereinafter more fully set forth, pointed out in my claims and illustrated in the accompanying drawings, wherein:

Figure 1 is a diagrammatic side view of an apparatus arranged to perform colorimetric analyses in accordance with the present invention; and Figures 2 and 3 are side views, on an enlarged scale of the test cell shown in Figure 1, for the purpose of illustrating the effect of varying test solution levels on the operation of the present invention.

Referring now more particularly to Figure 1 of the drawing, I have shown the vertical orientation of structural elements required for the construction of a colorimeter adapted to operate in accordance with the principles of this invention. It is an essential prerequisite that the various elements of the colorimeter be arranged along a vertical axis of orientation. A light source 10 of substantially constant predetermined intensity is positioned at the top of the apparatus, and is suitably shielded to direct its rays in a generally downward direction. Stabilization means of conventional electrical type may be utilized to insure constant light output despite minor variations in the electrical current supply. The magnitude of the light source may be selected as desired for the particular applications of intended use of the instrument, but it is important thereafter that the intensity of the selected light be maintained as constant as possible.

A condensing lens 12, or like optical means, and an apertured shield 14 cooperate to concentrate the emitted light and direct a conically divergent beam 16 of fixed intensity downwardly therefrom. The beam 16 passes through a pair of optical lenses 18 and 20, or like optical means, for transforming the light beam into a parallel and non-divergent column of light 24. This optical concentration of the emitted light into a beam of constant cross-section represents a critically important feature of this invention. A variable-opening shield, such as a conventional mechanical shutter or optical diaphragm 22, is disposed in the path of the straightened beam of light to permit manual adjustment of the amount of light finally transmitted and directed toward the sample to be tested. For certain test operations, involving materials of a very deep or intense hue, a greater light intensity is necessary than for other operations involving paler tints or colors. The shield 22, therefore, enables appropriate selection of the light beam without any change in the source 12.

A test cell, generally indicated at 26, is disposed in the path of the constant-intensity, parallel beam of light 24. It is an important feature of this invention that the test cell be constructed in a very particular geometric form and that its bottom wall be made of a transparent material having a substantially negligible light-obstructing effect, such as optical glass or the like. The cell 26 provides a bottom wall 28 of accurately flat or planar form disposed perpendicular to the parallel beam 24. The side wall 30 of the cell 26 is of cylindrical form, providing a surface parallel to the light beam 24. It is highly important that the test cell define an internal cylindrical volume of accurately constant cross-section. The term "cylindrical"

is used in its strict geometric sense, namely the closed surface generated by a straight line moving parallel to a fixed straight line. The cross-section of the cell 26, therefore, may be circular or of any convenient rectilinear shape. It is essential only that the cell cross-section be constant and that its bottom wall be flat and transparent.

Immediately below the test cell 26 is positioned a photoelectric cell 30, or like device sensitive to the intensity of light falling thereon, to receive the beam of light, now designated 24', after it has passed through the test cell 26. A suitable meter 32 or the like is provided in cooperation with the photoelectric cell 30, in conventional manner, for conveniently reading variations in the intensity of the transmitted light beam 24' as it is sensed by the photoelectric cell 30.

The optical light concentrating means provided by lenses 18 and 20 insures the provision of a parallel beam of light, all of the rays of which will be perpendicular to the surface of the solution placed in the test cell below. In this way, all of the incident rays of light are undeviated as they pass vertically downwardly through the test solution, and the effect of refraction and diffusion losses on the photoelectric cell 30 because of variations in liquid height are entirely eliminated. Any variations in the light sensed by the photoelectric cell 30 will be a direct consequence only of the light absorption of the colored solution in its path within the test cell 26. It is highly important, therefore, that the solvent used in making the test solution of the substance to be analyzed be entirely colorless so that any variation in the volume of test solution because of the quantity of solvent will have no effect upon the light transmission detected by the photoelectric cell 30.

The principle of operation of the apparatus which has been described will now be set forth in detail. The operation to be achieved is an accurate determination of the total amount of coloring substance present in a test solution without the necessity of determining the volume or layer thickness of the solution; that is, in a manner independent of concentration. The important principle of operation will be readily understood by considering a quantity of colored liquid in the cylindrical container, as shown in Figures 2 and 3. In Figure 2, a substantially greater amount of solution is present than in Figure 3. If the cell of Figure 3 is observed laterally from the side, as indicated by the diagrammatic eye, a certain intensity of color will be apparent. If additional colorless solvent is added to increase the volume of the same test solution to that shown in Figure 2, it is obvious that the observed intensity of color will be decreased. If these same observations are made from a position directly above the test cell, however, it will be apparent that the observed intensity of color will remain the same regardless of the quantity of solvent which may be added or removed. A sample of color-lending substance, in solution, will produce the same color impression independently of volume and hence concentration, provided that the observation is made directly from above the cylindrical cell or container of constant cross-section in which the solution is contained. This is the underlying basis for the vertical arrangement of light source, test cell, and photoelectric cell of this invention.

The importance of the parallel beam of light is also best illustrated by Figures 2 and 3 of the drawing. Assume that a sample of color-lending substance has been dissolved in a suitable solvent and placed in the test cell 26 to provide a liquid level $L_1$ (see Figure 3). A vertical ray of light $R_1$ will pass downwardly into the test cell 26, through the horizontal liquid surface $L_1$, through the height of test solution, through the flat transparent cell bottom 28, and into the photoelectric cell 30. The light-sensing cathode of the photoelectric cell 30 is indicated at 34, and the anode at 36. The ray $R_1$, and all of its immediately adjacent parallel rays of the beam 24' will pass along a straight and undeviated path to the photoelectric cell 30.

If the lenses 18 and 20 were omitted, the diverging light beam 16 would emit diverging light rays, such as that indicated at $R_2$, shown merely for convenience of illustration at the left of the ray $R_1$. Such a light ray $R_2$ will be bent as it passes from the less dense air into the more dense solution at $L_1$ in Figure 3, and again as it passes through the cell bottom 28. A certain proportion of such divergent rays will fall upon the light sensing cathode 34 of the photoelectric cell 30. If additional solvent is added to raise the solution height to a greater level, as indicated at $L_2$ in Figure 2, the bending effect of the test solution on the same light ray will be substantially greater. It will be apparent that the light ray $R_2$, which was detected by the photoelectric cell cathode 34 after passing through the relatively smaller volume of test solution of Figure 3, will not be detected after passing through the relatively greater volume of test solution of Figure 2. The amount of diverging light which can be sensed by the photoelectric cell 30, therefore, is necessarily dependent upon the volume or layer thickness of the test solution. By providing an optical condensing means, such as lenses 18 and 20, all of the light rays are vertically oriented into an unvarying parallel beam, and the operation of the colorimeter instrument of this invention becomes entirely independent of the volume of the test solution.

The practical importance of performing colorimetric determinations on a basis which is independent of the concentration of the test sample is best illustrated by the following example. In the colorimetric determination of molybdenum in steel, it has been customary to effect a chemical reaction with thiocyanate and to transfer the colored reaction product to a suitable colorless organic solvent. The solution is then raised to a predetermined test volume, and an aliquot portion removed and placed in a colorimeter apparatus of the types formerly known. With the present invention, however, it will be apparent that once the reaction with thiocyanate is completed, the further steps of transfer to an organic solvent and volume standardization can be omitted, and the sample placed directly in the colorimeter regardless of its concentration. It is merely necessary to read the standard value of the light source 12, as detected by the photoelectric cell 30, with the cell 26 empty, and to adjust the light intensity to a predetermined fixed value. This value should correspond with the intensity basis of a standard chart, previously prepared to establish a curve of known molybdenum quantities vs. detected light extinction. A second reading is then made with the test sample in the cell 26, and by reference to the standard chart the quantity of molybdenum present is immediately determined. By further reference to the weight of the original molybdenum sample, the percentage of molybdenum by weight in the sample may be readily computed.

It will be apparent that the use of a constant cross-section test cell for containing the sample to be analyzed, and the condensing and directing of a parallel beam of light directly vertically through the total depth of the sample, limits the factors which have previously caused variations in light tranmission through the color-lending material of the test sample. The light obstructing effect of the solvent used for the test sample is of little or no significance if a substantially colorless solvent is employed. The light obstructing effect of the transparent flat bottom of the test cell remains constant, and does not constitute a source of variation between tests. The only factor of direct and controlling importance is the influence of the color-lending material present in the test sample. In accordance with the Lambert-Beer law, Formula 1 above, the amount of light obstruction, as measured by the numerical product $k \times c \times l$, is dependent solely upon the weight of color-lending material and its characteristic specific extinction constant, when the apparatus of this invention is employed. It will be apparent that all calculations by the apparatus of this invention are inherently independent of concentration and sample height or liquid depth. Further, the use of a parallel beam of light eliminates all variations in light transmission which might occur because of refraction effects due to differences of sample height between tests.

These characteristics of the apparatus of the present invention enable not only a simplified procedure for colorimetric determinations as compared with prior devices, which were dependent upon sample volume or concentration, but also eliminate sources of error or inaccuracy arising from the problems of light refraction inherent in formerly known devices. It is possible, therefore, to utilize this invention with accuracy and dependability for both direct and "differential" colorimetric determinations.

Direct determinations have been illustrated by the testing of a manganese sample, discussed above. An analysis for compounds which do not provide convenient chemical reactions resulting in a detectable color require "differential" operation. As an illustrative example, a calcium compound present in a sample of known weight may be reacted to form calcium oxalate. A solution of permanganate is introduced in the test cell, and the quantity of manganese present determined by a suitable reading and comparison with a standard chart, in the manner previously discussed. The test sample, which has been reduced to calcium oxylate, is then added to the permanganate in the test cell. Reaction of the permanganate with the oxalate will take place, and a reduction or lessening of color intensity will occur. The difference between photoelectric readings before and after such reactions represents the quantity of calcium in the test sample. This procedure is essentially one of color subtraction, but rests upon the same principles of theory and operation as have been previously discussed in connection with direct determination of a color-lending material. In former devices, the addition of oxalate and the consequent increase in volume of the test sample requires necessary adjustments for the change in the concentration and sample height, making such operation complex and subject to errors. With the instrument of this invention, differential determinations may be made simply and accurately without regard to changes in the volume of the test sample.

Changes may be made in the construction and arrangement of the parts of my Photoelectric Colorimeter without departing from the real spirit and purpose of my invention, and it is my intention to cover by the claim any modified forms of structure or use of mechanical improvements which may be reasonably included within their scope.

What I claim as new and desire to obtain by Letters Patent of the United States is:

A method of colorimetric determination comprising the steps of first providing a source of light of substantially constant predetermined intensity, directing said light through optical light condensing means operative to concentrate the light into an unvarying parallel vertical beam, positioning a test cell having a flat "transparent bottom wall and being of substantially constant cross-section in vertical alignment with said parallel beam of light, placing in said test cell a liquid sample to be tested, said sample comprising an unknown quantity of color-lending substance and a sufficient quantity of a suitable colorless solvent to provide a sample of unknown volume and unknown concentration, maintaining the cross-section of said sample constant throughout its full vertical height, receiving the light passing through said test cell on photosensitive means for detecting and measuring the intensity of light after obstruction by said test sample, and employing said light intensity measurement for calculating the quantitative amount of color-lending material in said sample entirely independently of the volume and concentration of said sample.

References Cited in the file of this patent

UNITED STATES PATENTS

| | | |
|---|---|---|
| 814,036 | Gerard | Mar. 6, 1906 |
| 1,746,525 | Darrah | Feb. 11, 1930 |
| 1,938,004 | Baden | Dec. 5, 1933 |
| 2,043,589 | Muller | June 9, 1936 |
| 2,045,124 | Cummins, et al. | June 23, 1936 |
| 2,282,741 | Parker | May 12, 1942 |

FOREIGN PATENTS

| | | |
|---|---|---|
| 144,341 | Austria | Jan. 10, 1936 |
| 690,808 | Great Britain | Apr. 29, 1953 |